(12) United States Patent
Chiu

(10) Patent No.: US 7,880,663 B2
(45) Date of Patent: Feb. 1, 2011

(54) MANIPULATOR WITH MOTOR SPEED ADJUSTABLE ACTUATED CIRCUIT USED TO CONTROL REMOTE-CONTROLLED SPOTLIGHT

(76) Inventor: Shih-Yung Chiu, 2F., No. 8, Alley 16, Lane 235, Baociao Rd., Sindian City, Taipei County (TW) 231

( * ) Notice: Subject to any disclaimer, the term of this patent is extended or adjusted under 35 U.S.C. 154(b) by 882 days.

(21) Appl. No.: 11/822,075

(22) Filed: Jul. 2, 2007

(65) Prior Publication Data
US 2009/0009377 A1 Jan. 8, 2009

(51) Int. Cl.
G08C 19/12 (2006.01)
(52) U.S. Cl. ............. 341/173; 340/825.69; 340/825.72; 340/10.5; 318/480; 318/16; 362/464
(58) Field of Classification Search ............ 340/825.69, 340/825.72, 10.5; 341/173; 318/480, 16; 362/464, 512, 111
See application file for complete search history.

(56) References Cited
U.S. PATENT DOCUMENTS

| 3,809,182 | A | * | 5/1974 | Wilson | 182/148 |
| 4,930,057 | A | * | 5/1990 | Williams | 362/272 |
| 5,041,825 | A | * | 8/1991 | Hart et al. | 340/3.4 |
| 6,120,262 | A | * | 9/2000 | McDonough et al. | 417/424.1 |
| 7,296,917 | B1 | * | 11/2007 | Chiu | 362/464 |
| 7,425,805 | B2 | * | 9/2008 | Hsu | 318/16 |
| 2005/0248930 | A1 | * | 11/2005 | Naval et al. | 362/85 |

* cited by examiner

Primary Examiner—Albert K Wong
(74) Attorney, Agent, or Firm—Bacon & Thomas, PLLC

(57) ABSTRACT

A hand-held manipulator is an independent device and has a motor actuated circuit functioned to supply a 12-volt DC power and a motor speed adjustable actuated circuit provided with voltage adjustable function to regulate the motor actuated circuit to supply a regulated voltage smaller or greater than 12-volt DC power, and then the hand-held manipulator is particularly adapted to connect with a 12-volt DC power source for wireless or manual remotely controlling a remote-controlled spotlight by way of constant speed, slower speed or faster speed to adjust its lighting direction.

8 Claims, 8 Drawing Sheets

MANIPULATOR WITH MOTOR SPEED ADJUSTABLE ACTUATED CIRCUIT USED TO CONTROL REMOTE-CONTROLLED SPOTLIGHT

BACKGROUND OF THE PRESENT INVENTION

1. Field of the Present Invention

The invention relates to a hand-held manipulator with motor speed adjustable actuated circuit used to remotely control a remote-controlled spotlight, and more particularly the hand-held manipulator is adapted to adjust the lighting direction of the remote-controlled spotlight by constant speed, slower speed or faster speed.

2. Description of Prior Act

As illustrated in FIG. 1, a known remote-controlled spotlight 10 is a kind of searchlight provided with lighting direction adjustable in both tilting and panning manner by a manual remote controller 15.

The known spotlight 10 comprises a lamp housing 20 constituted by an upper housing 21 and a lower housing 22, a base means 30 for mounting the lamp housing 20, a lamp means 40 pivotedly mounted in the lamp housing 20 for vertically tilting movement, a vertical drive means 50 mounted in the lamp housing 20 for driving the lamp means 40 moved in tilting movement to adjust the lighting direction in a vertical plane, a horizontal drive means 60 mounted in the base means 30 for driving the lamp means 40 and lamp housing 20 moved in panning movement to adjust the lighting direction in a horizontal plane less than 360 degrees, and an electrical cable 70 used as a power source.

The electrical cable 70 has an electric plug 75 used to connect a 12 volt power source and then supply all the power needed to the spotlight 10. And, the manual remote controller 15 bound on the electrical cable 70 has 4-directional controlled buttons SW1, SW2, SW3 and SW4 and a bulb power button SW5 for remotely controlling the spotlight 10.

The electrical cable 70 provides three leads 71, 72 and 73. A bulb installed on the lamp means 40 for lighting is electrically connected to a 12-volt DC power source through the leads 71 and the electric plug 75 of the electrical cable 70, but the bulb is remotely controlled to switch power on or off for lighting by operating the SW5 of the manual remote controller 15.

The vertical drive means 50 of the spotlight 10 is electrically connected to a 12-volt DC power source through the leads 72 and the electric plug 75 of the electrical cable 70, but the vertical drive means 50 is remotely controlled to be driven in clockwise rotation or in counterclockwise rotation to drive the lamp means 40 moved in tilting movement by supplying either positive or negative 12-volt DC power from operating the corresponding SW1 or SW2 of the manual remote controller 15.

The horizontal drive means 60 of the spotlight 10 is electrically connected to a 12-volt DC power source through the leads 73 and electric plug 75 of the electrical cable 70, but the horizontal drive means 60 is remotely controlled to be driven in clockwise rotation or in counterclockwise rotation to drive the lamp means 40 and lamp housing 20 moved in panning movement by supplying either positive or negative 12-volt DC power from operating the corresponding SW3 or SW4 of the manual remote controller 15.

Accordingly, to any place to need to light, when a vehicle or a yacht has the spotlight 10 mounted on the roof 11 of the vehicle or on the desk of the yacht to serve as a searchlight, the operator who drives the vehicle or the yacht, do not need to move the position of the vehicle or the yacht, may use the manual remote controller 15 placed inside the vehicle or the yacht to remotely control the spotlight 10 to switch the spotlight 10 on lighting as well as to undergo tilting and panning movement in both vertical and horizontal directions for adjusting the spotlighting to the place that need to light.

Due to without speed control function, the spotlight 10 is only provided to drive the lamp means 40 moved at constant speed in both tilting and panning movement from remote control by the manual remote controller 15.

However, on various occasions when the operator needs to use the spotlight 10 of the vehicle or the yacht by much faster or slower speed to adjust the spotlighting to the place that need to light, it is obvious the scope of application to the spotlight 10 is then limited.

In addition, the manual remote controller 15 of the spotlight 10, without a RF receiver installed inside, can only carry out manual remote control but can not carry out wireless remote control.

Thus, if the manual remote controller 15 can be improved with speed control function and/or wireless remote control function for the known spotlight 10, the spotlight 10 shall be more applicable in many aspects.

SUMMARY OF THE INVENTION

Therefore, the main object of the present invention is to provide a hand-held manipulator selectively having a wireless remote control function or manual remote control function or both and particularly having a motor speed adjustable actuated circuit adapted to adjust the lighting direction of a remote-controlled spotlight by constant speed, slower speed or faster speed.

The preferred embodiment of the hand-held manipulator of the present invention is an independent device and provided with wireless remote control function, which is adapted to connect with a 12-volt DC power source for wireless remotely controlling a remote-controlled spotlight, which comprises a RF receiver for receiving RF controlled signals transmitted from a separated portable wireless transmitter; a MCU for decoding the received RF control signals input from the RF receiver and outputting corresponding control signals; a relay actuated circuit controlled by the MCU for outputting a 12-volt DC power; a motor actuated circuit controlled by the MCU for outputting a 12-volt DC power; and a motor speed adjustable actuated circuit provided with voltage adjustable function and controlled by the MCU to regulate the motor actuated circuit to supply a regulated voltage smaller or greater than 12-volt DC power.

Another preferred embodiment of the hand-held manipulator of the present invention in addition to having wireless remote control function is further provided with a hand controlled circuit to get a manual remote control function.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
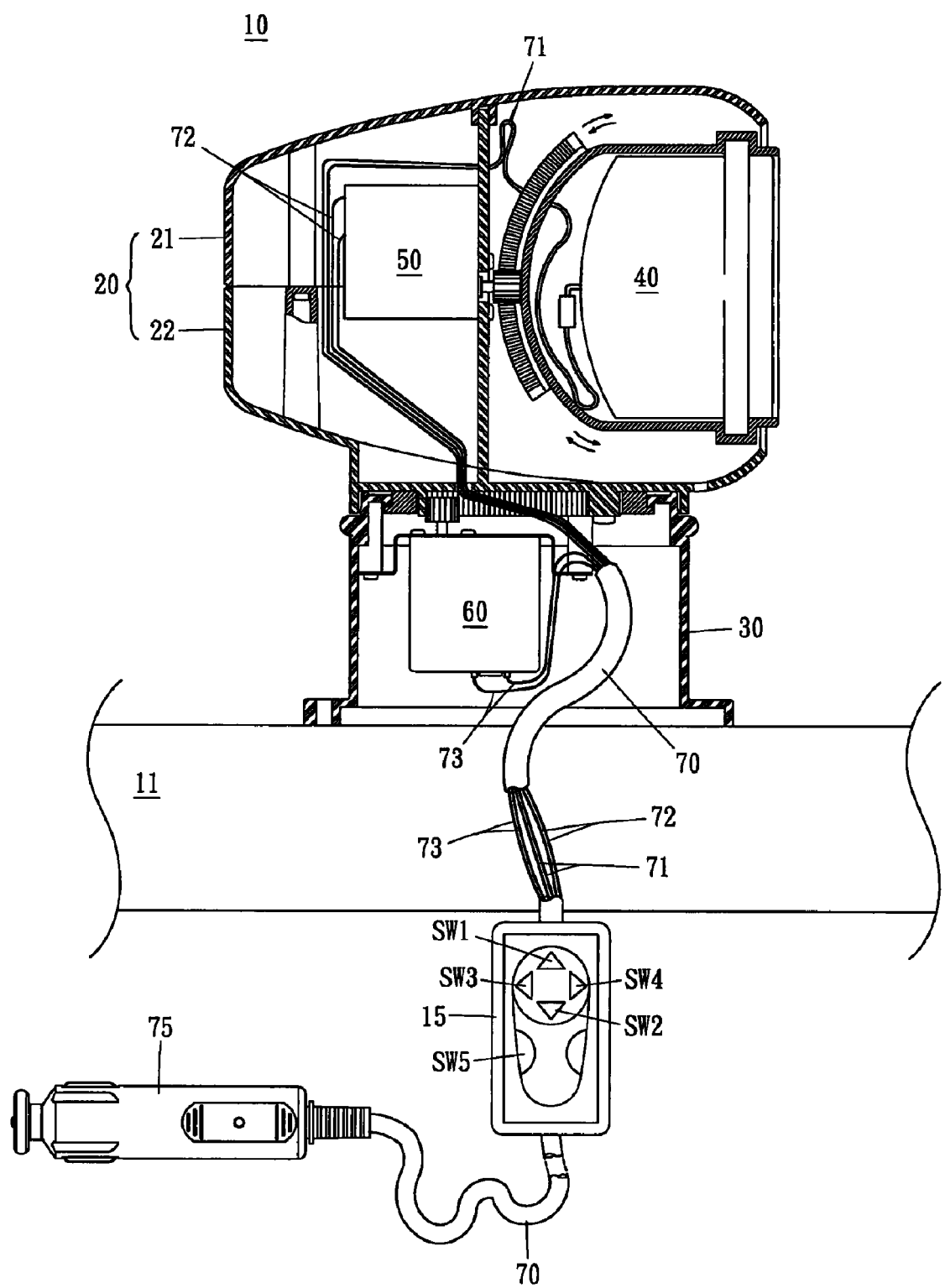
FIG. 1 is an illustrating drawing to show a remote-controlled spotlight having a manual remote controller bound on an electrical cable extended from the spotlight and connected to a 12-volt DC power source, and using the manual remote controller to manual remotely control the spotlight to be operated by constant speed to adjust the spotlighting to the place that need to light.

Before the present invention is described in greater detail, it should be noted that like elements are denoted by the same reference numerals throughout the disclosure.

Figure 2:
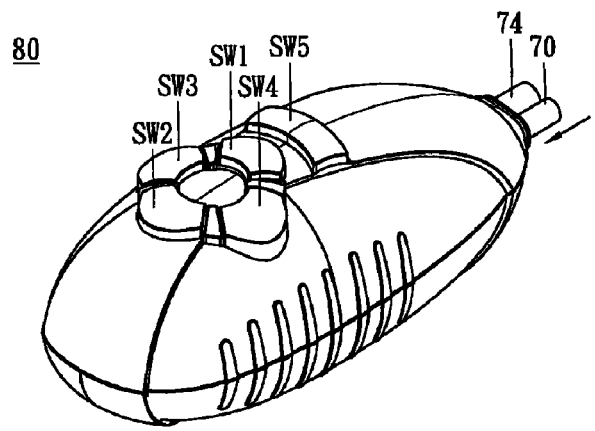
FIG. 2 is a schematic perspective view of one preferred embodiment of a hand-held manipulator provided with both wireless and manual control functions in accordance with the present invention.
Figure 3:
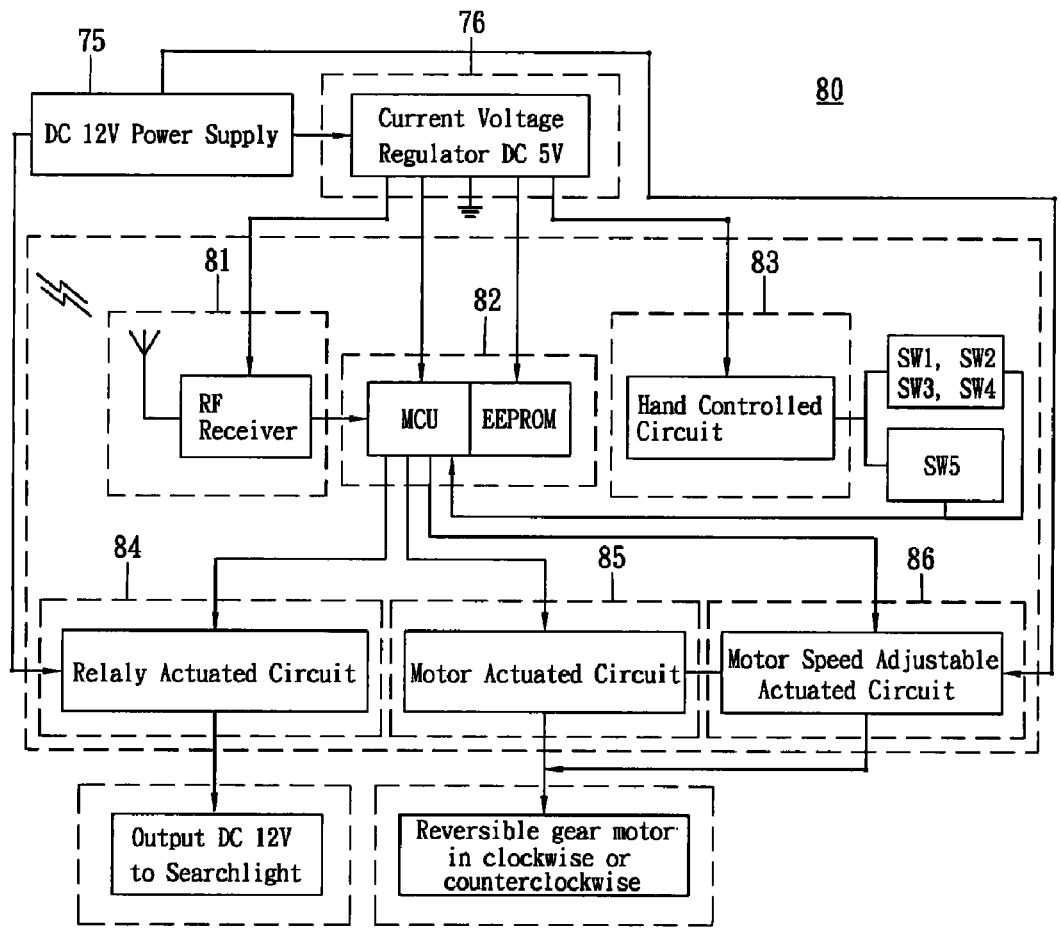
FIG. 3 is a schematic circuit diagram of the hand-held manipulator of the present invention of FIG. 2 which provides wireless and manual remote control functions and further provides a motor speed adjustable actuated circuit to regulate a motor actuated circuit to supply a regulated voltage smaller or greater than 12-volt DC power.
Figure 4:
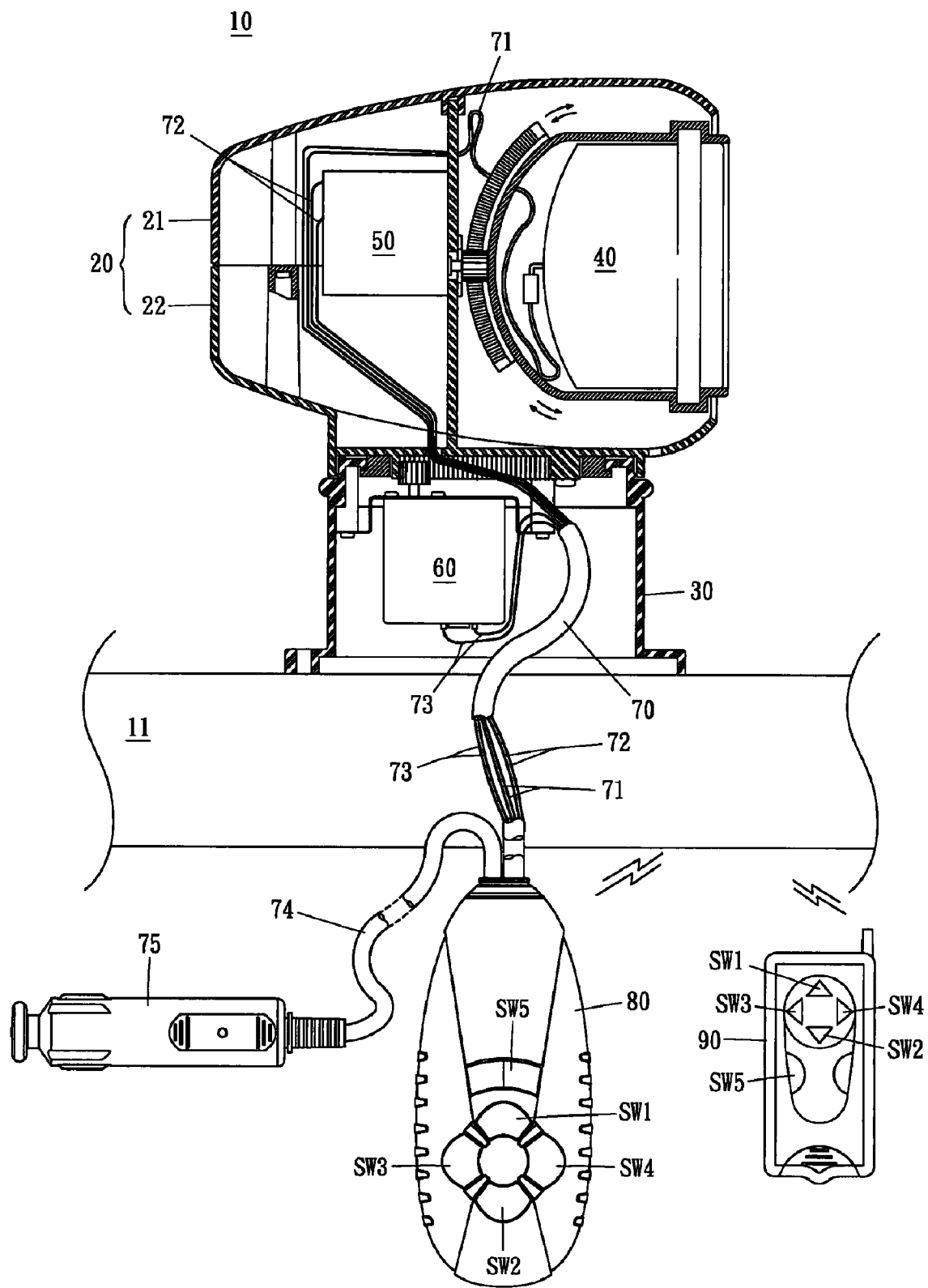
FIG. 4 is an illustrating drawing to show the hand-held manipulator of the present invention of FIG. 2 is used as a connector to connect an electrical cable of a remote-controlled spotlight and another electrical cable for supplying a 12-volt DC power and further used to wireless or manual remotely control the spotlight to be operated by constant speed or much faster or slower speed to adjust the spotlighting to the place that need to light.

As shown in FIGS. 2 to 4, the preferred embodiment of a hand-held manipulator 80 of the present invention is an independent device provided with function of being used as a connector to in electricity connect an electrical cable 70, which includes three leads 71, 72 and 73 and is extended from a known remote-controlled spotlight 10, and another electrical cable 74 having an electric plug 75 for connecting to a 12-volt DC power source.

The hand-held manipulator 80 of the present invention for constituting various preferred embodiments, except having function of being used as a connector mentioned above, also may selectively has a wireless remote control function or manual remote control function, or both.

The hand-held manipulator 80 of the present invention as shown in FIGS. 3 and 4 is designed to have both wireless and manual remote control functions, which comprises a RF receiver 81, a microcontroller (MCU) 82 with ROM or EEPROM, a hand controlled circuit 83, a relay actuated circuit 84, a motor actuated circuit 85 and a motor speed adjustable actuated circuit 86. In addition, a current voltage regulator 76 is adapted to convert a 12-volt DC power source into a 5-volt DC current power which is required by the RF receiver 81, the MCU 82, the ROM or EEPROM, and the hand controlled circuit 83.

Figure 5:
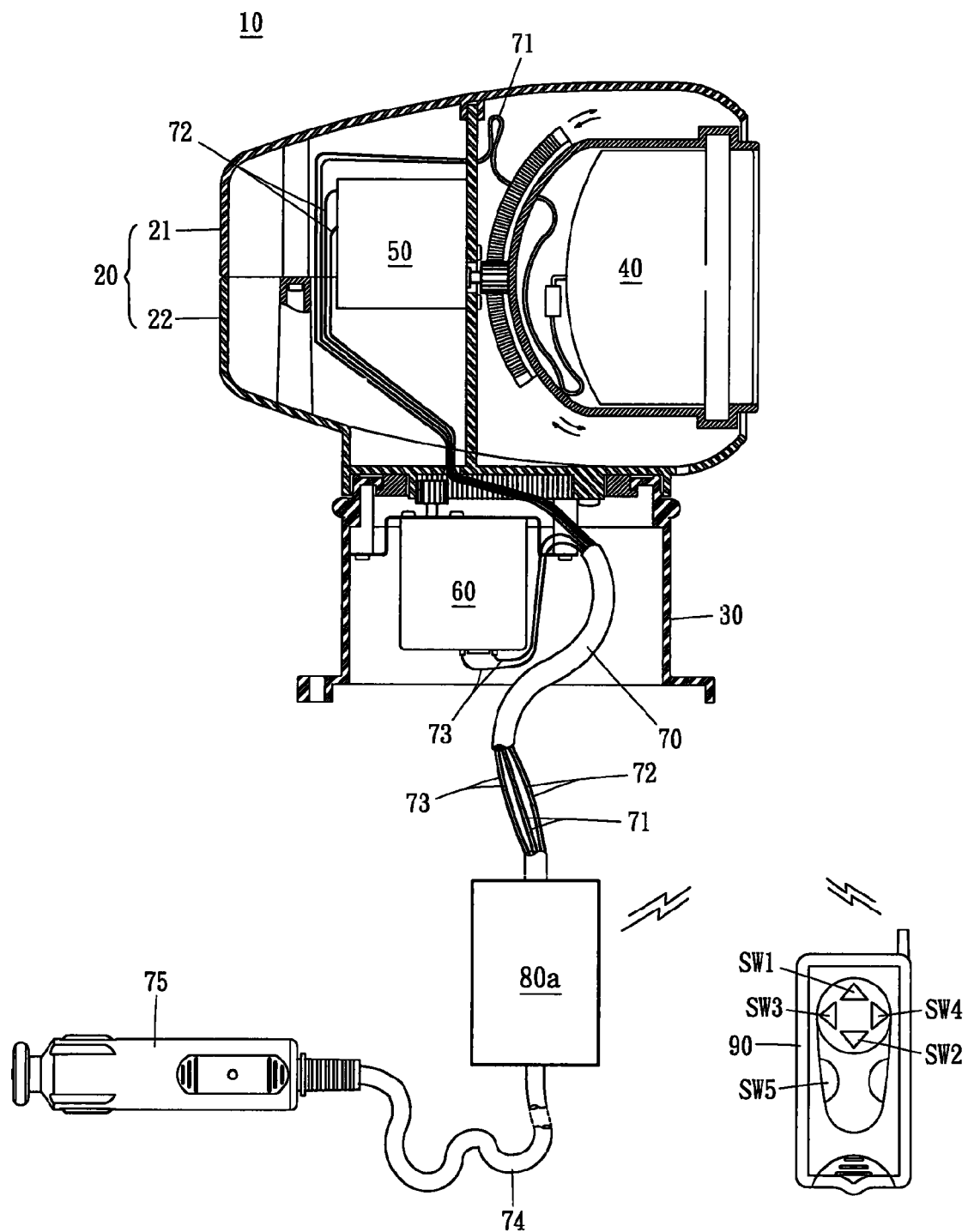
FIG. 5 is an illustrating drawing to show another preferred embodiment of the hand-held manipulator of the present invention only provided with wireless control function is used as a connector to connect an electrical cable of a remote-controlled spotlight and another electrical cable for supplying a 12-volt DC power and further used to wireless remotely control the spotlight to be operated by constant speed or much faster or slower speed to adjust the spotlighting to the place that need to light.
Figure 6:
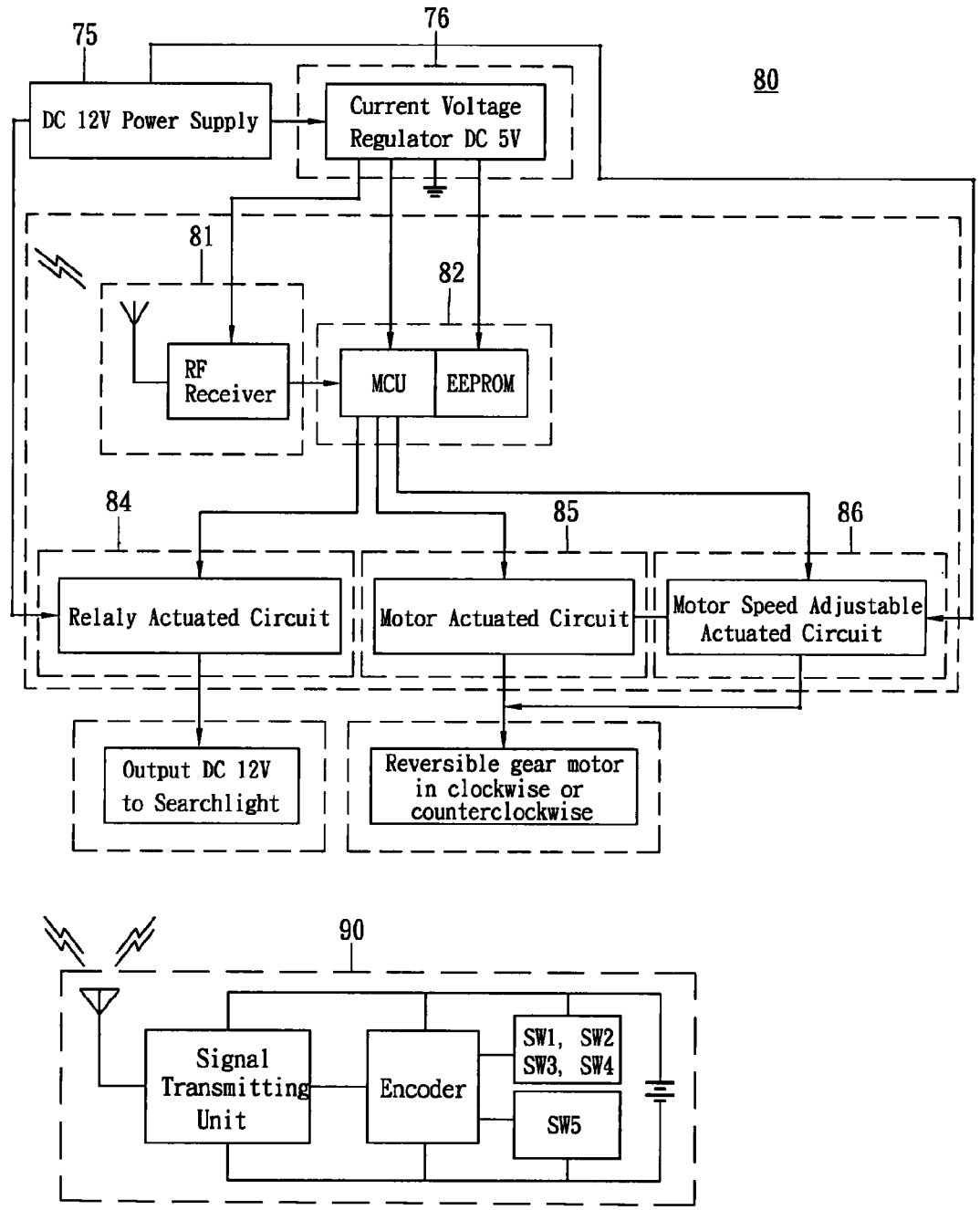
FIG. 6 is a schematic circuit diagram of both the hand-held manipulator of the present invention only with wireless remote control illustrated in FIG. 5 and a corresponding separated wireless transmitter.

As illustrated in FIGS. 5 and 6, another hand-held manipulator 80a of the present invention, by use of omitting the hand controlled circuit 83 from the hand-held manipulator 80, is designed to only have wireless remote control function.

Figure 7:
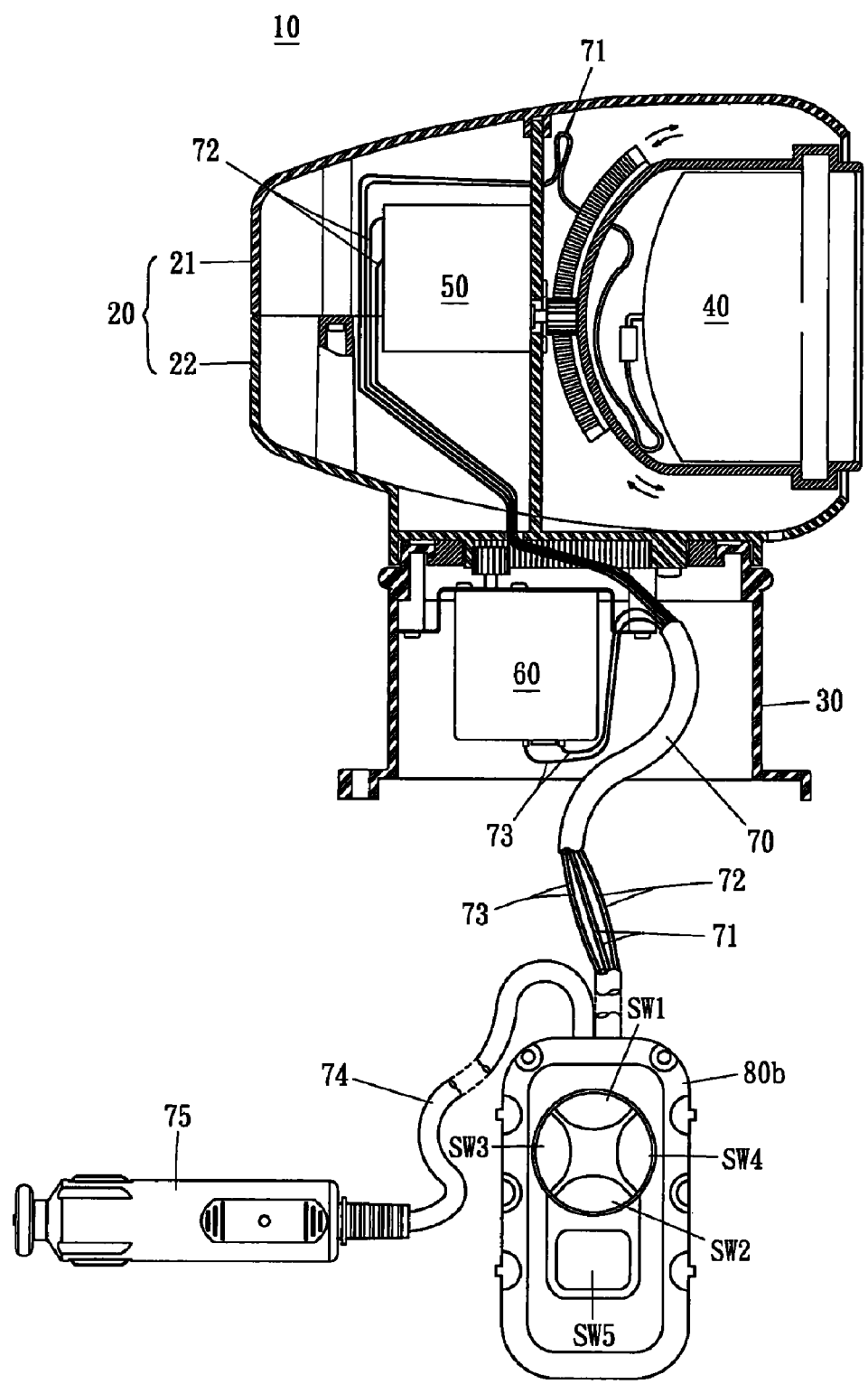
FIG. 7 is an illustrating drawing to show further another preferred embodiment of the hand-held manipulator of the present invention only provided with manual control function is used as a connector to connect an electrical cable of a remote-controlled spotlight and another electrical cable for supplying a 12-volt DC power and further used to manual remotely control the spotlight to be operated by constant speed or much faster or slower speed to adjust the spotlighting to the place that need to light.
Figure 8:
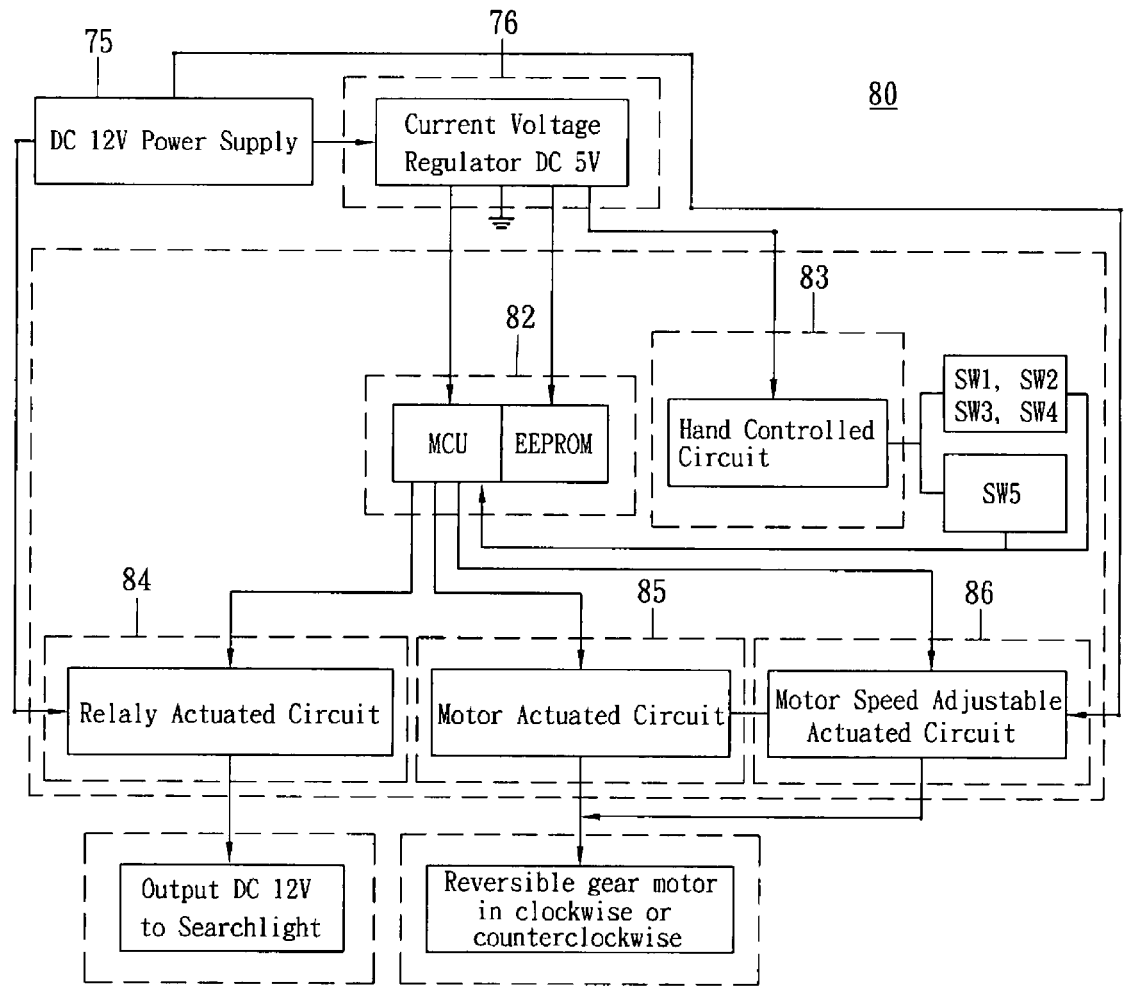
FIG. 8 is a schematic circuit diagram of the hand-held manipulator of the present invention only with manual remote control illustrated in FIG. 7.

As illustrated in FIGS. 7 and 8, further another hand-held manipulator 80b of the present invention, by use of omitting the RF receiver 81 from the hand-held manipulator 80, is designed to only have manual remote control function.

After one end of the electrical cable 74 had connected with the hand-held manipulator 80, 80a or 80b of the present invention and its electric plug 75 had simultaneously connected to a 12-volt DC power source. Thus, by proceeding with wireless or manual remote control, the motor actuated circuit 85 of the hand-held manipulator 80, 80a or 80b of the present invention is then functioned to constantly supply a 12-volt DC power, and the motor speed adjustable actuated circuit 86 is especially provided with voltage adjustable function to regulate the motor actuated circuit 85 to supply a regulated voltage smaller or greater than 12-volt DC power.

Therefore, the hand-held manipulator 80, 80a or 80b of the present invention in practical application may provide for a known remote-controlled spotlight 10 to be remotely controlled by way of constant speed, slower speed or faster speed to adjust its lighting direction.

Figure 9:
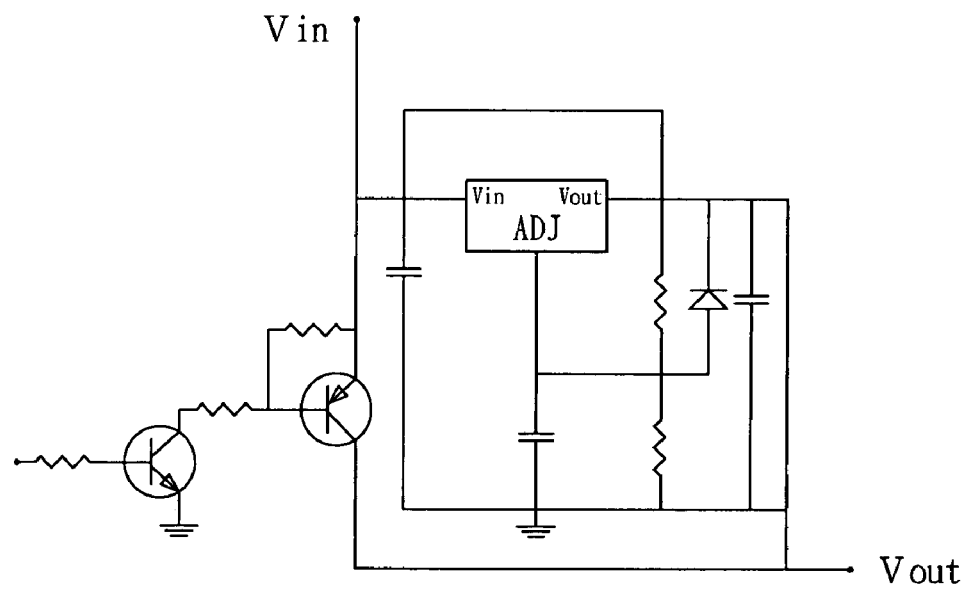
FIG. 9 is a voltage regulation IC circuit with voltage adjustable function adapted to the hand-held manipulator of the present invention.
Figure 10:
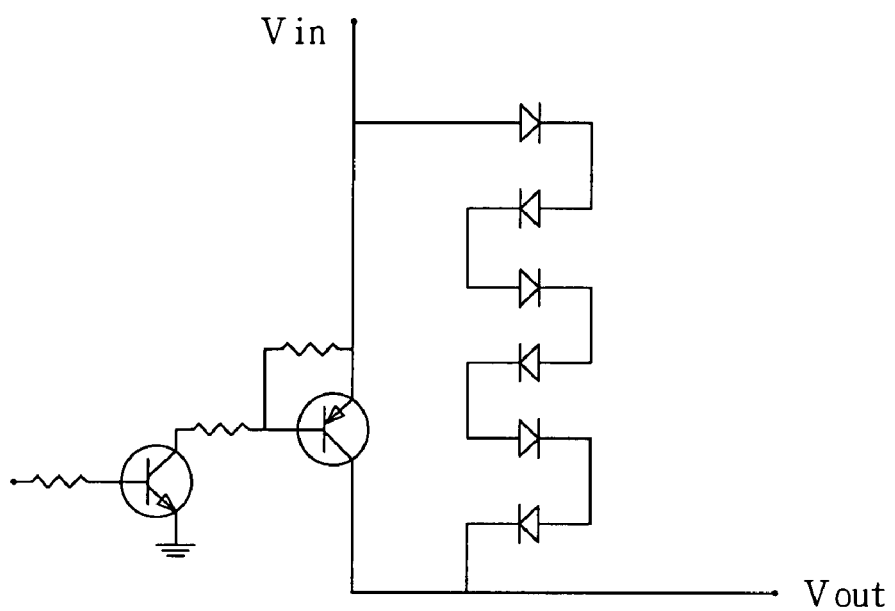
FIG. 10 is a voltage regulation series diodes circuit with voltage adjustable function adapted to the hand-held manipulator of the present invention.

The preferred embodiment of the motor speed adjustable actuated circuit 86 with voltage adjustable function may be a kind of voltage regulation IC circuit as shown in FIG. 9 or a voltage regulation series diodes circuit as shown in FIG. 10.

In addition, the motor speed adjustable actuated circuit 86 may further be another kind of digital voltage regulated circuit controlled by the Pulse Width Modulation of the MCU 82 to regulate the output voltage of the motor actuated circuit 85.

The RF receiver 81 is installed inside the hand-held manipulator 80 or 80a, which function is to receive an identification code and a RF signal transmitted from a separated wireless transmitter 90 and subsequently send the received identification code and RF signal to the input port of the MCU 82.

The MCU 82 is an IC component that independently carries out specific control functions and integrates related circuits for the central processing unit (CPU), read-on memory (ROM) or electrically erasable programmable read-on memory (EEPROM), random access memory, I/O control circuit and CTC timer on a single chip.

Since the ROM or EEPROM of the MCU 82 contains the information of the identification code and the corresponding decoding for the received RF control signals transmitted from the wireless transmitter 90, therefore, after the identification code received by the RF receiver 81 is confirmed by the MCU 82, the MCU 82 will decode the input corresponding received RF signals into relative corresponding control signals and sent out to immediately control either the relay actuated circuit 84 or the motor actuated circuit 85 to be in opened or closed circuit or further control the motor speed adjustable actuated circuit 86 to regulate the motor actuated circuit 85 to output a regulated voltage smaller or greater than 12-volt DC power when the motor actuated circuit 85 is still in closed circuit.

The hand controlled circuit 83 of the hand-held manipulator 80 or 80b includes a four-way directional control switch SW1, SW2, SW3 and SW4 and an on/off switch SW5, which function is to receive an controlling signal output from any one of switches of SW1, SW2, SW3, SW4 and SW5 and subsequently send the controlling signal to the input port of the MCU 82. Likewise, after confirmed by the MCU 82, the MCU 82 will sent out relative corresponding control signals to immediately control the relay actuated circuit 84 and/or the motor actuated circuit 85 or the motor speed adjustable actuated circuit 86 alternatively.

Referring to FIG. 4, 5 or 7, when the known remote-controlled spotlight 10 provided with lighting direction adjustable in both tilting and panning movement is permanently mounted on the roof 11 of a vehicle or the deck of a yacht, the electrical cable 70 extended from the spotlight 10 and another electrical cable 74 for connecting to a 12-volt DC power source are both connected to the hand-held manipulator 80, 80a or 80b of the present invention.

After assembling, the relay actuated circuit 84 and/or the motor actuated circuit 85 of the hand-held manipulator 80, 80a or 80b of the present invention is normally to be in opened circuit between the electrical cable 70 and the electrical cable 74, so that no power is supplied to the spotlight 10. Whether each leads 71, 72 or 73 of the electrical cable 70 of the spotlight 10 can just obtain a 12-volt DC power supplied through the electrical cable 74 only by passing either wireless or manual remote control from the hand-held manipulator 80, 80a or 80b of the present invention.

Accordingly, the relay actuated circuit 84 of the hand-held manipulator 80, 80a or 80b of the present invention is functioned to control whether a 12-volt DC power supplied from the electrical cable 74 could be output to the leads 71 of the electrical cable 70 of the spotlight 10 to light on a bulb for lighting. By proceeding with either wireless or manual remote control from the hand-held manipulator 80, 80a or 80b of the present invention, the spotlight 10 is then remotely controlled to be powered on or off for lighting.

Likewise, the motor actuated circuit 85 of the hand-held manipulator 80, 80a or 80b of the present invention is functioned to control whether a 12-volt DC power supplied from the electrical cable 74 could be output to the leads 72 or 73 of the electrical cable 70 of the spotlight 10. By proceeding with either wireless or manual remote control from the hand-held manipulator 80, 80a or 80b of the present invention, the spotlight 10 is then remotely controlled to actuate the vertical drive means 50 and/or the horizontal drive means 60 of the spotlight 10 to adjust the lighting direction in both tilting and panning movement by constant speed.

Further, during wireless or manual remotely control to adjust the lighting direction of the spotlight 10, by use of the motor speed adjustable actuated circuit 86 of the hand-held manipulator 80, 80a or 80b of the present invention, a regulated voltage smaller or greater than 12-volt DC power could be output from the motor actuated circuit 85 to actuate vertical drive means 50 and/or horizontal drive means 60 of the spotlight 10. At the moment, the spotlight 10 is then operated by much faster or slower speed to adjust the spotlighting to the place that need to light.

What is claimed is:

1. A hand-held manipulator adapted to connect with a 12-volt DC power source for remotely controlling a remote-controlled spotlight by constant speed or much faster or slower speed to adjust lighting direction, which comprising:
    a RF receiver for receiving RF controlled signals transmitted from a separated portable wireless transmitter;
    a MCU for decoding the received RF control signals input from the RF receiver and outputting corresponding control signals;
    a relay actuated circuit controlled by the MCU for outputting a 12-volt DC power;
    a motor actuated circuit controlled by the MCU for outputting a 12-volt DC power; and
    a motor speed adjustable actuated circuit provided with voltage adjustable function and controlled by the MCU to regulate the motor actuated circuit to supply a regulated voltage smaller or greater than 12-volt DC power.

2. The hand-held manipulator as defined in claim 1, wherein the motor speed adjustable actuated circuit is a kind of voltage regulation IC circuit.

3. The hand-held manipulator as defined in claim 1, wherein the motor speed adjustable actuated circuit is a kind of voltage regulation series diodes circuit.

4. The hand-held manipulator as defined in claim 1, wherein the motor speed adjustable actuated circuit is a kind of digital voltage regulated circuit controlled by the Pulse Width Modulation of the MCU.

5. The hand-held manipulator as defined in claim 1, further comprising a hand controlled circuit includes a four-way directional control switch SW1, SW2, SW3 and SW4 and an on/off switch SW5, and the MCU is accordingly received an controlling signal input from any one of switches of SW1, SW2, SW3, SW4 and SW5 to immediately control the relay actuated circuit and/or the motor actuated circuit or the motor speed adjustable actuated circuit alternatively.

6. The hand-held manipulator as defined in claim 5, wherein the motor speed adjustable actuated circuit is a kind of voltage regulation IC circuit.

7. The hand-held manipulator as defined in claim 5, wherein the motor speed adjustable actuated circuit is a kind of voltage regulation series diodes circuit.

8. The hand-held manipulator as defined in claim 5, wherein the motor speed adjustable actuated circuit is a kind of digital voltage regulated circuit controlled by the Pulse Width Modulation of the MCU.

* * * * *